United States Patent
Ohsawa et al.

(10) Patent No.: US 10,513,217 B2
(45) Date of Patent: Dec. 24, 2019

(54) OPTICAL AXIS CONTROL DEVICE FOR HEADLIGHT

(71) Applicant: MITSUBISHI ELECTRIC CORPORATION, Tokyo (JP)

(72) Inventors: Takashi Ohsawa, Tokyo (JP); Wataru Tsujita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 155 days.

(21) Appl. No.: 15/561,604

(22) PCT Filed: May 27, 2015

(86) PCT No.: PCT/JP2015/065292
§ 371 (c)(1),
(2) Date: Sep. 26, 2017

(87) PCT Pub. No.: WO2016/189707
PCT Pub. Date: Dec. 1, 2016

(65) Prior Publication Data
US 2018/0065539 A1    Mar. 8, 2018

(51) Int. Cl.
*B60Q 1/08* (2006.01)
*B60Q 1/115* (2006.01)

(52) U.S. Cl.
CPC .......... *B60Q 1/115* (2013.01); *B60Q 1/085* (2013.01); *B60Q 2300/112* (2013.01); *B60Q 2300/132* (2013.01); *B60Q 2300/32* (2013.01)

(58) Field of Classification Search
CPC ........ B60Q 2300/112; B60Q 2300/114; B60Q 2300/132; B60Q 2300/32; B60Q 1/085; B60Q 1/115
See application file for complete search history.

(56) References Cited

U.S. PATENT DOCUMENTS

| | | | |
|---|---|---|---|
| 2012/0101692 A1 | 4/2012 | Kasaba et al. | |
| 2014/0156150 A1* | 6/2014 | Kasaba | B60Q 1/10 701/49 |
| 2015/0308827 A1* | 10/2015 | Fujii | G01C 19/00 702/151 |
| 2017/0129390 A1 | 5/2017 | Akaza et al. | |
| 2018/0257540 A1* | 9/2018 | Ohsawa | B60Q 1/115 |
| 2018/0334083 A1* | 11/2018 | Nakamura | B60Q 1/115 |

FOREIGN PATENT DOCUMENTS

| | | |
|---|---|---|
| JP | 2012-106719 A | 6/2012 |
| JP | 2014-104788 A | 6/2014 |
| JP | 2014-108639 A | 6/2014 |
| WO | WO 2016/042599 A1 | 3/2016 |
| WO | WO 2016/143124 A1 | 9/2016 |

* cited by examiner

*Primary Examiner* — Khoi H Tran
*Assistant Examiner* — Robert T Nguyen
(74) *Attorney, Agent, or Firm* — Birch, Stewart, Kolasch & Birch, LLP

(57) ABSTRACT

A control unit of an optical axis control device for a headlight calculates a first vehicle angle (θα) and a second vehicle angle (θβ) at different timings in traveling of a vehicle, and calculates a third vehicle angle (θs) at which a difference between acceleration signals in a front-rear direction (ΔX) is zero. The control unit calculates a representative value (θS) based on a distribution of a plurality of third vehicle angles (θs), and generates a signal for operating an optical axis of the headlight based on the representative value (θS).

12 Claims, 12 Drawing Sheets

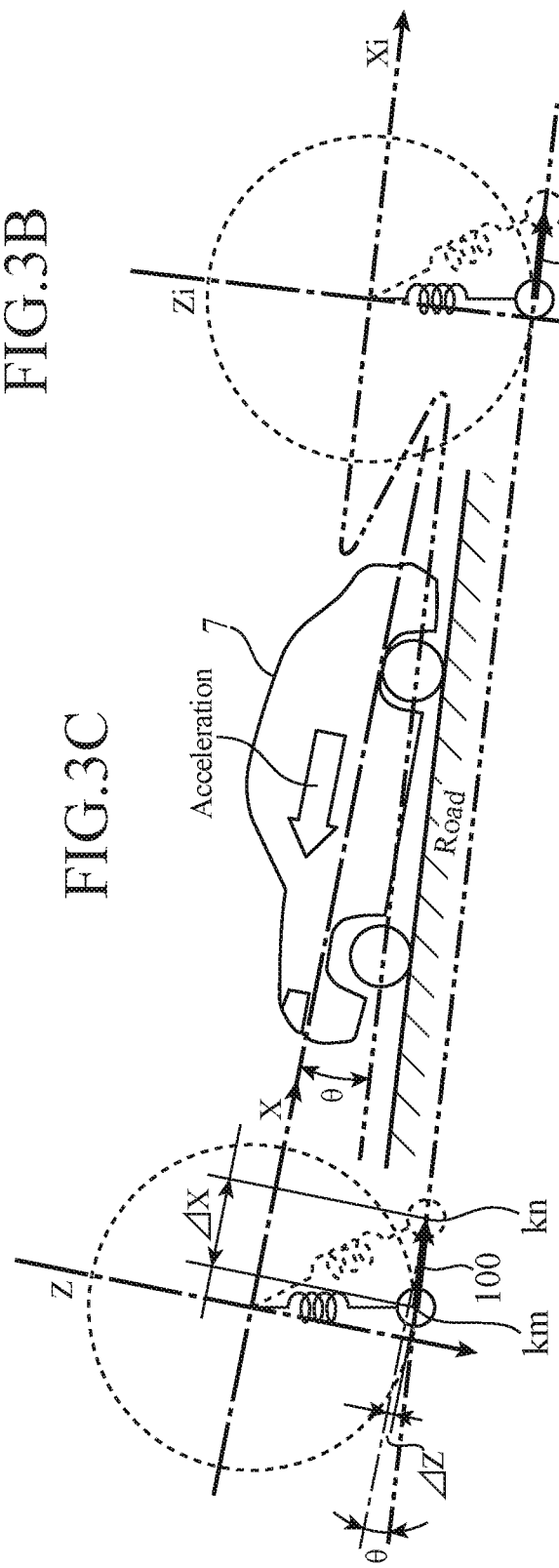

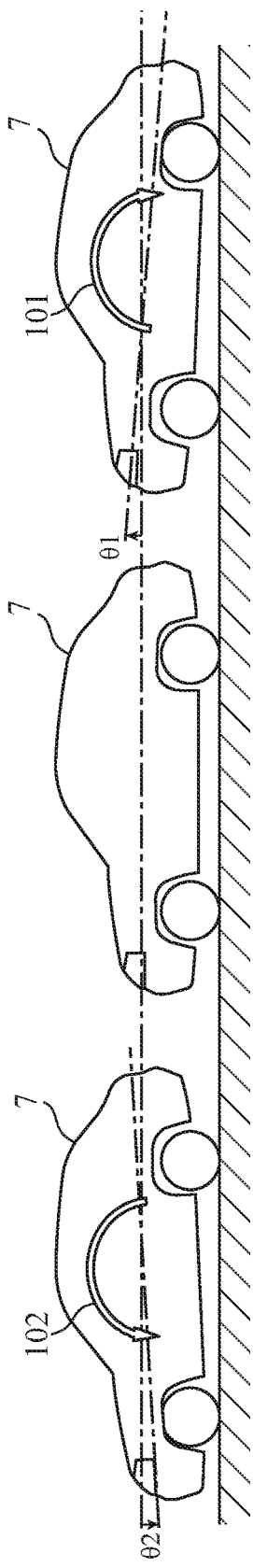

FIG.11A
FIG.11B
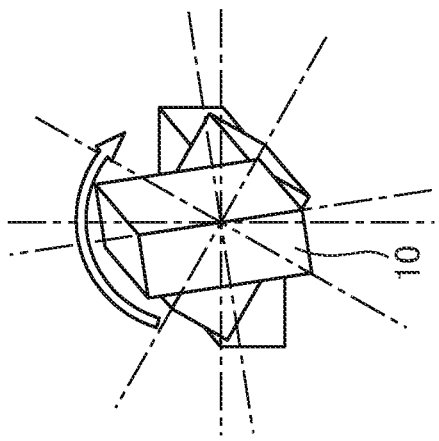
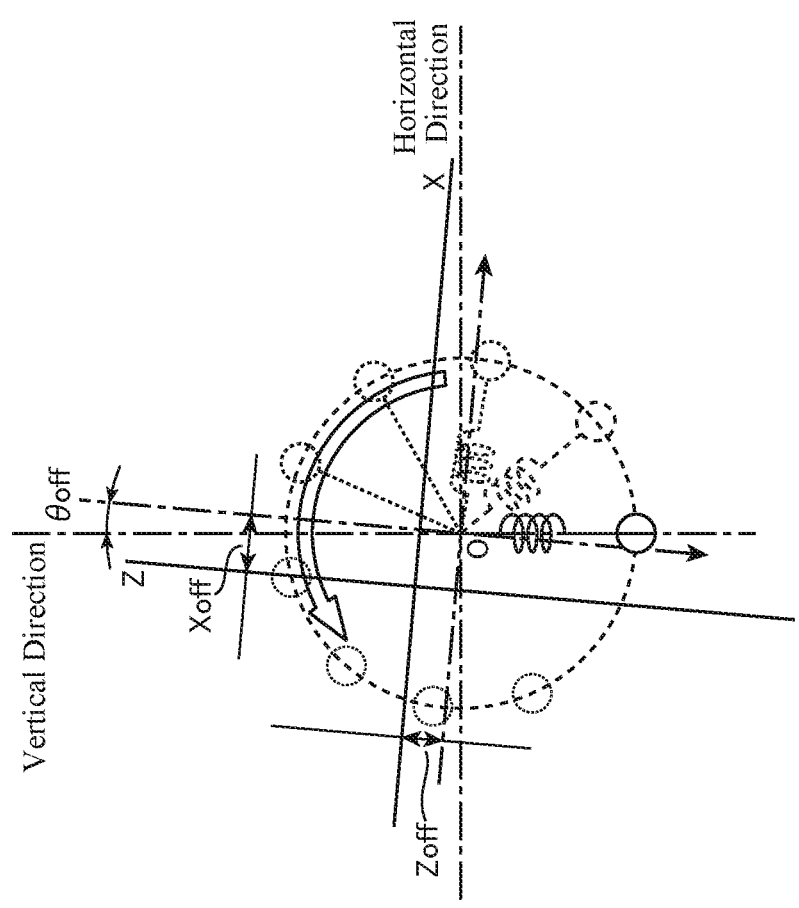

OPTICAL AXIS CONTROL DEVICE FOR HEADLIGHT

TECHNICAL FIELD

This invention relates to an optical axis control device for a headlight that controls an optical axis of a headlight mounted on a vehicle, using an acceleration signal measured by an acceleration sensor.

BACKGROUND ART

For a headlight mounted on a vehicle, in order to improve safety for night driving while expressing excellent design and sophisticated impression, a bright discharge lamp and a light-emitting diode (LEDs) that provide bright illumination in desired directions are widely used as light sources in place of a conventional halogen lamp.

Upon mounting the above-described bright light sources on a vehicle, for example, when the rear of the vehicle drops and leans due to a passenger getting into the rear seat or the loading of luggage into the trunk, in other words, when the front of the vehicle is raised and thus the illumination directions of headlights lean upward, in order to prevent a driver of an oncoming vehicle from getting blinded and also prevent a pedestrian facing the headlights from getting annoyed, there is a need to move the illumination directions of the headlights, i.e., the optical axes of the headlights, downward to maintain the directions of the optical axes with respect to a road surface in fixed directions. In short, for a vehicle that uses the above-described bright light sources, it is necessary to mount an optical axis control device for a headlight thereon. The optical axis control device for a headlight is such that, at least when the vehicle leans due to a passenger getting in the vehicle or the loading of luggage into the trunk and accordingly the illumination directions of headlights are changed upward, the illumination directions of the headlights are operated to move downward to bring the illumination directions back to those before the change.

Note that the passenger's getting in the vehicle or the loading luggage is performed when the vehicle is stopped, and thus, the control of the optical axis by the optical axis control device for a headlight is mainly performed when the vehicle is stopped.

Meanwhile, control of the optical axes of the headlights is to operate the optical axes upward or downward to cancel out a change in vehicle lean angle with respect to a road surface so that the illumination directions of the headlights can be brought back to their original directions when the vehicle leans in the front-rear direction as described above. Thus, first, there is a need to measure the vehicle lean angle with respect to the road surface. In the following, the vehicle lean angle with respect to the road surface is called a "vehicle angle".

Conventionally, using a stroke sensor mounted on suspensions (suspension devices) at the front and rear of a vehicle, the amounts of compression of the front and rear suspensions, i.e., the amounts of sinking of front and rear axle portions, are measured and a vehicle angle is calculated based on a difference between the amounts of front and rear sinking, and the length of the wheelbase.

In these days, in addition to a configuration using the above-described stroke sensors mounted on suspensions, a configuration has been considered in which an acceleration sensor capable of detecting the gravitational acceleration is used, such as the configuration shown in Patent Literature 1, for example. In the configuration using the acceleration sensor, it is easy to detect a change in the lean angle of a vehicle being stopped, and it is easy to obtain the vehicle angle at the present time by accumulating the amounts of changes occurring due to a passenger getting in and out of the vehicle, etc., on an initial vehicle angle. On the other hand, an offset and a change in the offset over time are present in outputs from the acceleration sensor and the above-described vehicle angle obtained by the accumulation includes a potential cumulative error, so that there is a problem that a vehicle angle obtained by accumulating measured values and changes has low accuracy. Hence, to stably maintain the optical axes of the headlights at proper angles over a long period of time, accuracy needs to be ensured by applying some kind of correction to an acceleration measured by the acceleration sensor or by removing a cumulative error included in a vehicle angle.

An optical axis control device of the above-described Patent Literature 1 increases the accuracy of a vehicle angle while using acceleration sensors for two axes, the front-rear direction and up-down direction of the vehicle, and performs not only optical axis control when the vehicle is stopped, but also optical axis control by measuring an acceleration when the vehicle is travelling, in order to perform preferable control of the optical axes of headlights. The optical axis control device of the above-described Patent Literature 1 obtains, for each period of time, a direction of acceleration change, using an acceleration measured when the vehicle is traveling, or obtains a direction of acceleration change, from two accelerations at different measurement timings, and thereby calculates a vehicle angle and controls the optical axes based on the change in the vehicle angle.

CITATION LIST

Patent Literature

Patent Literature 1: JP 2012-106719 A

SUMMARY OF INVENTION

Technical Problem

In an actual vehicle, upon acceleration the lean of the vehicle changes in the direction in which the front of the vehicle is raised or the rear drops, and upon deceleration the lean changes in the direction in which the front of the vehicle drops or the rear is raised. Hence, the change direction of the acceleration upon acceleration or deceleration of the vehicle is not linear.

However, in the above-described Patent Literature 1, it is premised that the vehicle angle does not change even if the vehicle accelerates or decelerates, and the change direction of the acceleration upon acceleration or deceleration is obtained by linear approximation as shown in FIGS. 4 and 6 of Patent Literature 1. That is, the above-described Patent Literature 1 does not take the fact that the lean angle changes due to the acceleration or deceleration of the vehicle into consideration, and thus, there is a problem that a vehicle angle with high accuracy cannot be obtained.

Further, in the configuration of the above-described Patent Literature 1, detection values of the acceleration sensor are plotted over time in the coordinate in which the acceleration in the front-rear direction of the vehicle is set to be the first axis and the acceleration in the up-down direction of the vehicle is set to be the second axis. In such a configuration, there is a problem that a large memory for storing a large number of detection values is required, and at the same time, complex computation for obtaining a single angle from the large number of detection values is required.

The present invention is made to solve the above problems, and an object of the present invention is to calculate a vehicle angle with high accuracy that does not include a lean angle error occurring due to the acceleration or deceleration of a vehicle, and to reduce the memory capacity and computation load required to calculate the vehicle angle.

Solution to Problem

According to the present invention, an optical axis control device for a headlight, the optical axis control device includes: a control unit calculating a vehicle angle using an acceleration signals in an up-down direction and in a front-rear direction, and generating a signal to operate an optical axis of the headlight, the acceleration signals being measured by an acceleration sensor mounted on a vehicle, and the vehicle angle being a lean angle of the vehicle with respect to a road surface. In a state in which the vehicle is traveling, the control unit: calculates a first vehicle angle from a ratio of a difference between acceleration signals in the up-down direction measured at two first time points to a difference between acceleration signals in the front-rear direction measured at the two first time points; calculates a second vehicle angle from a ratio of a difference between acceleration signals in the up-down direction measured at two second time points to a difference between acceleration signals in the front-rear direction measured at the two second time points, the two second time points differing from the two first time points; calculates a third vehicle angle being an angle when a difference between acceleration signals in the front-rear direction is zero, using the first vehicle angle and the difference between acceleration signals in the front-rear direction used to calculate the first vehicle angle, and the second vehicle angle and the difference between acceleration signals in the front-rear direction used to calculate the second vehicle angle; and calculates a plurality of third vehicle angles, each of which is the third vehicle angle, to calculate a representative value of the third vehicle angles based on a distribution of the plurality of third vehicle angles, and generates a signal to operate the optical axis of the headlight, based on the representative value.

Advantageous Effects Of Invention

According to the present invention, a third vehicle angle when the difference between acceleration signals in the front-rear direction is zero is calculated using a first vehicle angle, a difference between acceleration signals in the front-rear direction used to calculate the first vehicle angle, a second vehicle angle, and a difference between acceleration signals in the front-rear direction used to calculate the second vehicle angle, and a plurality of third vehicle angles are calculated to calculate a representative value of the third vehicle angles based on a distribution of the third vehicle angles, and a signal for operating the optical axis of the headlight is generated based on the representative value. Thus, the memory capacity and computation load required to calculate the representative value can be reduced. In addition, a representative value corresponding to a vehicle angle in a state in which the vehicle is stopped or traveling at a constant speed can be obtained, and thus, the optical axis of the headlight can be operated accurately using the vehicle angle that does not include a lean angle error occurring due to the acceleration or deceleration of the vehicle.

BRIEF DESCRIPTION OF DRAWINGS

FIGS. 3A to 3C are diagrams for explaining relationship between acceleration and a vehicle angle in the first embodiment;

FIGS. 4A to 4C are diagrams for explaining a lean of the vehicle that changes by acceleration or deceleration in the first embodiment;

FIGS. 11A and 11B are diagrams for explaining the initial setting method for the optical axis control device for a headlight according to the first embodiment.

DESCRIPTION OF EMBODIMENTS

To describe the present invention in more detail, some embodiments for carrying out the present invention will be described below with reference to the accompanying drawings.

First Embodiment

Figure 1:
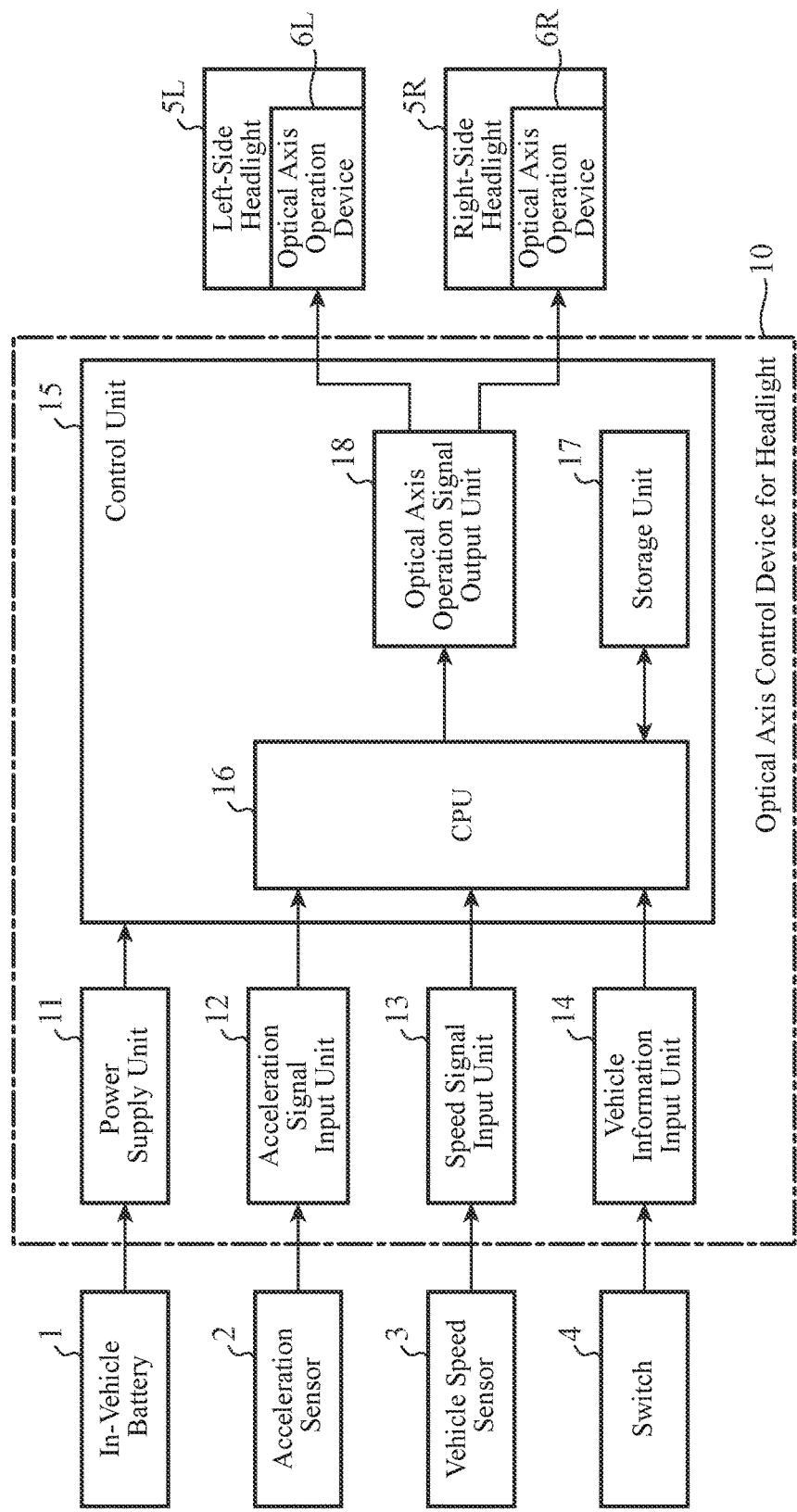
FIG. 1 is a block diagram showing an exemplary configuration of an optical axis control device for a headlight according to a first embodiment of the present invention.

FIG. 1 is a block diagram showing an exemplary configuration of an optical axis control device for a headlight 10 according to a first embodiment of the present invention. The optical axis control device for a headlight 10 according to the first embodiment includes a power supply unit 11, an acceleration signal input unit 12, a speed signal input unit 13, a vehicle information input unit 14, and a control unit 15. The control unit 15 includes a central processing unit (CPU) 16, a storage unit 17 composed of a semiconductor memory, etc., and an optical axis operation signal output unit 18.

Figure 2A:
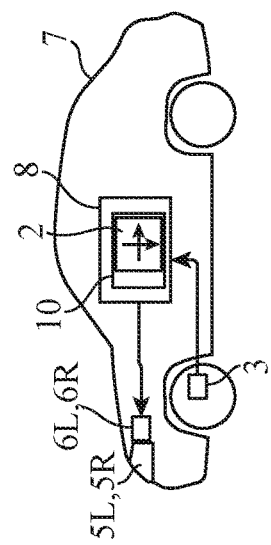
FIGS. 2A to 2C are diagrams showing examples in which the optical axis control device for a headlight according to the first embodiment is mounted on a vehicle.
Figure 2B:
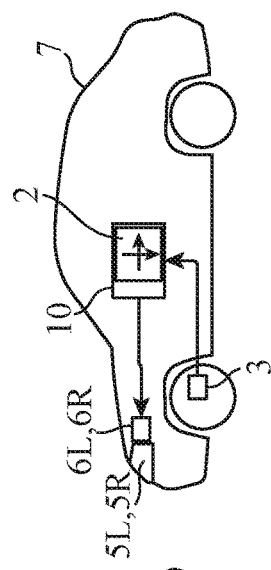
Figure 2C:
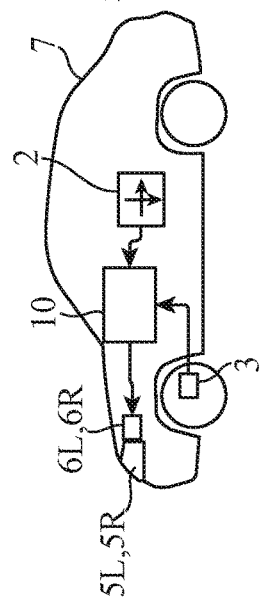

FIGS. 2A to 2C are diagrams showing examples in which the optical axis control device for a headlight 10 is mounted on a vehicle 7. In the vehicle 7, a left-side headlight 5L and a right-side headlight 5R that include optical axis operation devices 6L and 6R for adjusting the direction of each of the optical axes of the left-side and right-side headlights 5L and 5R; an acceleration sensor 2; a vehicle speed sensor 3; and the optical axis control device for a headlight 10 are installed. The acceleration sensor 2 measures an acceleration in a front-rear direction applied to the vehicle 7 and an acceleration in an up-down direction applied to the vehicle 7, and outputs the measured accelerations as acceleration signals. The vehicle speed sensor 3 measures a vehicle speed of the vehicle 7 and outputs the measured vehicle speed as a speed signal.

In an example of FIG. 2A, the optical axis control device for a headlight 10 and the acceleration sensor 2 are formed separately. In an example of FIG. 2B, the optical axis control device for a headlight 10 and the acceleration sensor 2 are formed integrally such that the acceleration sensor 2 is contained in the optical axis control device for a headlight 10. In an example of FIG. 2C, the optical axis control device for a headlight 10 formed integrally with the acceleration sensor 2 is contained in another in-vehicle electrical component 8.

Note that when the optical axis control device for a headlight 10 is contained in the in-vehicle electrical component 8 as in FIG. 2C, some or all of the functions of the power supply unit 11, the acceleration signal input unit 12, the speed signal input unit 13, the vehicle information input unit 14, and the optical axis operation signal output unit 18 may be provided in the optical axis control device for a headlight 10 or may be provided in the in-vehicle electrical component 8.

The optical axis control device for a headlight 10 maintains the optical axes of the left-side and right-side headlights 5L and 5R, which illuminate an area in front of the vehicle 7, to fixed positions in the up-down direction.

The power supply unit 11 is a device that supplies power of an in-vehicle battery 1 to the control unit 15. The acceleration signal input unit 12, the speed signal input unit 13, and the vehicle information input unit 14 are communication devices, and communicate with vehicle-side devices such as the acceleration sensor 2, the vehicle speed sensor 3, and a switch 4 through a vehicle communication network such as a controller area network (CAN). The switch 4 is an ignition switch, a lighting switch, a dimmer switch, or the like. The acceleration signal input unit 12 inputs the acceleration signals in the front-rear direction and up-down direction which are outputted from the acceleration sensor 2 to the CPU 16. The speed signal input unit 13 inputs a speed signal outputted from the vehicle speed sensor 3 to the CPU 16. The vehicle information input unit 14 inputs vehicle information indicating the content of operation performed on the switch 4 of the vehicle 7 by a driver to the CPU 16.

The CPU 16 calculates a lean angle of the vehicle 7 with respect to a road surface, using the acceleration signals and speed signals in the front-rear direction and up-down direction, to generate an optical axis operation signal for canceling out a change in the lean angle of the vehicle 7 with respect to the road surface. The optical axis operation signal output unit 18 is a communication device that outputs the optical axis operation signal calculated by the CPU 16 to the optical axis operation devices 6L and 6R.

In the following, the lean angle of the vehicle 7 with respect to the road surface is called a "vehicle angle".

The optical axis operation devices 6L and 6R operate the optical axis angle of each of the headlights 5L and 5R in accordance with the optical axis operation signal inputted from the optical axis control device for a headlight 10, and thereby perform optical axis control so as to cancel out a change in the vehicle angle of the vehicle 7. According to such an operation, even if the vehicle angle of the vehicle 7 is changed, the optical axes of the headlights 5L and 5R with respect to the road surface are maintained in fixed positions.

FIGS. 3A to 3C are diagrams describing a relationship between an acceleration and a vehicle angle.

In the description of the first embodiment, a measuring coordinate system for acceleration is used in which the up-down direction of the vehicle 7 is the Z-axis and the front-rear direction of the vehicle 7 is the X-axis, and as shown in FIG. 3A, the direction and magnitude of an acceleration applied to the vehicle 7, which serves as the acceleration measuring coordinate system, are represented by the position of a weight hanging from a spring.

Note that considering a planar quadrilateral whose four vertices are the center points of front/rear left and right wheels touching a road surface, as a virtual chassis, since the plane of the virtual chassis is parallel to the road surface, the angle θ formed by the virtual chassis and the vehicle body supported by a suspension (suspension device) is the lean angle of the vehicle 7 with respect to the road surface, i.e., the vehicle angle. Taking such a relation into consideration, in FIG. 3B, an acceleration applied to the acceleration measuring coordinate system viewed from the virtual chassis of the vehicle 7, which is equivalent to that viewed from the road side, is represented as behavior of the weight hanging from the spring. Note that in the drawing, the up-down direction of the virtual chassis is the Zi-axis and the front-rear direction is the Xi-axis.

As shown in FIG. 3B, when the vehicle 7 accelerates, the weight moves parallel to the road surface in both a horizontal road and a slope. From a different point of view, the weight moves in the Xi-axis direction of the virtual chassis. That is, a change in acceleration due to the vehicle's traveling is parallel to the road surface, i.e., in the direction shown by an arrow 100 which is the Xi-axis direction of the virtual chassis.

On the other hand, as shown in FIG. 3A, when an acceleration applied to the vehicle 7 is viewed from the acceleration measuring coordinate system set in the vehicle body supported by the suspension, too, caused by the acceleration of the vehicle 7, the weight moves in the Xi-axis direction of the virtual chassis as in the above case, regardless of the X-axis direction which is the front-rear direction of the acceleration measuring coordinate system.

From the above-described behavior of the weight, the angle θ formed by the X-axis in the front-rear direction of the acceleration measuring coordinate system and the Xi-axis of the virtual chassis, i.e., the vehicle angle which is the lean angle of the vehicle 7 with respect to the road surface, can be detected as the angle θ formed by the X-axis in the front-rear direction and the direction in which the weight moves by the acceleration of the vehicle 7 (arrow 100).

Therefore, in the acceleration measuring coordinate system set in the vehicle 7, it is possible to calculate a vehicle angle regardless of ascent or descent of a traveling road, by observing the amount of movement (the arrow 100) of the weight that moves in the direction parallel to the road surface at two time points, the km point and kn point, i.e., a difference between accelerations in the up-down direction and a difference between accelerations in the front-rear direction.

However, when an actual vehicle 7 accelerates or decelerates, the vehicle 7 leans forward or backward (pitching). Here, FIG. 4B shows an example of a vehicle 7 in a state in which the vehicle 7 is being stopped and the vehicle body is at rest, FIG. 4A shows an example of a vehicle 7 decelerating, and FIG. 4C shows an example of a vehicle 7 accelerating.

When a vehicle 7 accelerates, as shown in FIG. 4C, the vehicle 7 rotates at a rotation angle θ1 in a direction indicated by the arrow 101, and leans in the direction in which the front of the vehicle 7 is raised or the rear drops. For reference, the dropping of the rear of the vehicle 7 upon acceleration is called "squatting".

When the vehicle 7 decelerates, as shown in FIG. 4A, the vehicle 7 rotates at a rotation angle θ2 in the direction indicated by the arrow 102, and leans in the direction in which the front of the vehicle 7 drops or the rear is raised. For reference, the dropping of the front of the vehicle 7 upon deceleration is called "nose-diving".

As shown above, the vehicle angle includes an error in the lean that is changed due to the acceleration or deceleration of the vehicle 7, i.e., the pitch angle, the accuracy of a vehicle angle obtained from accelerations at two indefinite time points at which the vehicle shows a state of squatting or nose-diving is low. Therefore, it is not appropriate to use a vehicle angle directly that is obtained from accelerations at two indefinite time points, for controlling the optical axes of the headlights.

Meanwhile, the pitching angle correlates with acceleration, and the pitching angle increases in accordance with the magnitude of acceleration. Hence, as in the graph shown in FIG. 5, by plotting vehicle angles θ with respect to differences between acceleration signals in the front-rear direction of the vehicle 7, i.e., differential accelerations ΔX in the front-rear direction, and drawing a representative straight line 110 passing through a lot of plotted vehicle angles θ, to obtain the vehicle angle at which the differential acceleration ΔX in the front-rear direction is zero, a vehicle angle can be obtained that corresponds to a state in which the vehicle 7 is stopped or a state in which the vehicle 7 is traveling at a constant speed, where the influence of pitching occurring when the vehicle 7 accelerates or decelerates is eliminated.

Figure 5:
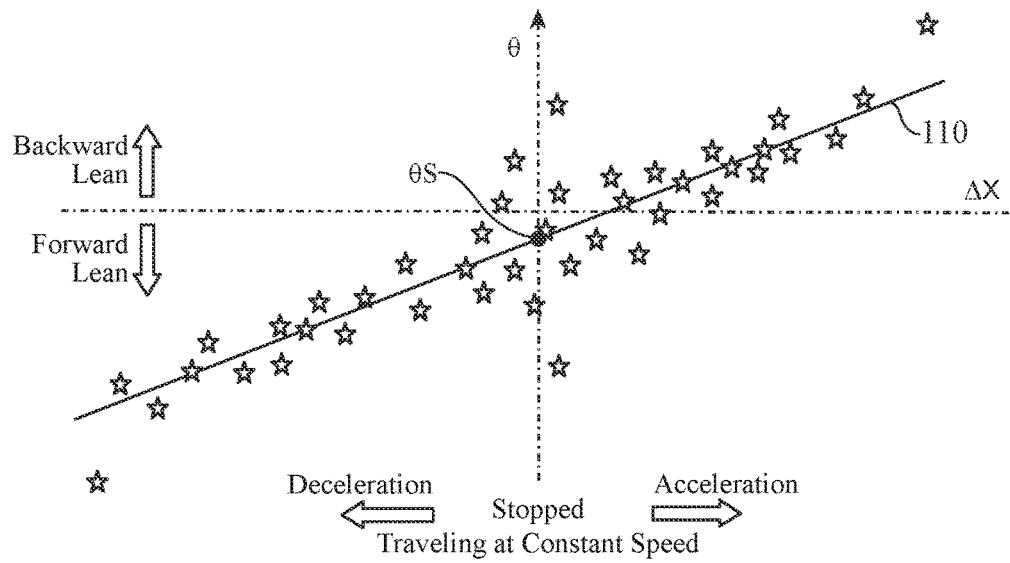
FIG. 5 is a graph for explaining a relationship between a difference between acceleration signals in a front-rear direction of the vehicle and a vehicle angle, as a reference example for helping understanding of the first embodiment.

In this FIG. 5, vehicle angles θ which are calculated using acceleration signals measured by the acceleration sensor 2 are plotted as stars in the coordinate in which the horizontal axis is the differential acceleration ΔX in the front-rear direction and the vertical axis is the vehicle angle θ. A vehicle angle corresponding to a state in which the vehicle 7 is stopped or a state in which the vehicle 7 is traveling at a constant speed, where the influence of pitching occurring when the vehicle 7 accelerates or decelerates is eliminated, is called a representative vehicle angle θS.

The differential acceleration ΔX in the front-rear direction is a difference between an acceleration signal in the front-rear direction at a certain time point and an acceleration signal in the front-rear direction at another time point which are measured by the acceleration sensor 2, i.e., a difference between acceleration signals in the front-rear direction at two time points. Note that in FIG. 5 an acceleration signal measured in a state in which the vehicle 7 is stopped or a state in which the vehicle 7 is traveling at a constant speed is used as an acceleration signal at the km point, and a difference between the acceleration signal at the km point and an acceleration signal at the kn point is set as a differential acceleration ΔX on the horizontal axis.

In order to calculate a representative vehicle angle θS by plotting a lot of vehicle angles θ with respect to differential accelerations ΔX in an orthogonal coordinate system and drawing a representative straight line 110 as in the graph of FIG. 5, a large capacity memory for storing a large number of vehicle angles θ and differential accelerations ΔX is required, and at the same time, a CPU capable of processing complex computation is required. Hence, it is undeniable that the configuration of the optical axis control device for a headlight 10 becomes complicated, and its cost increases.

Figure 6:
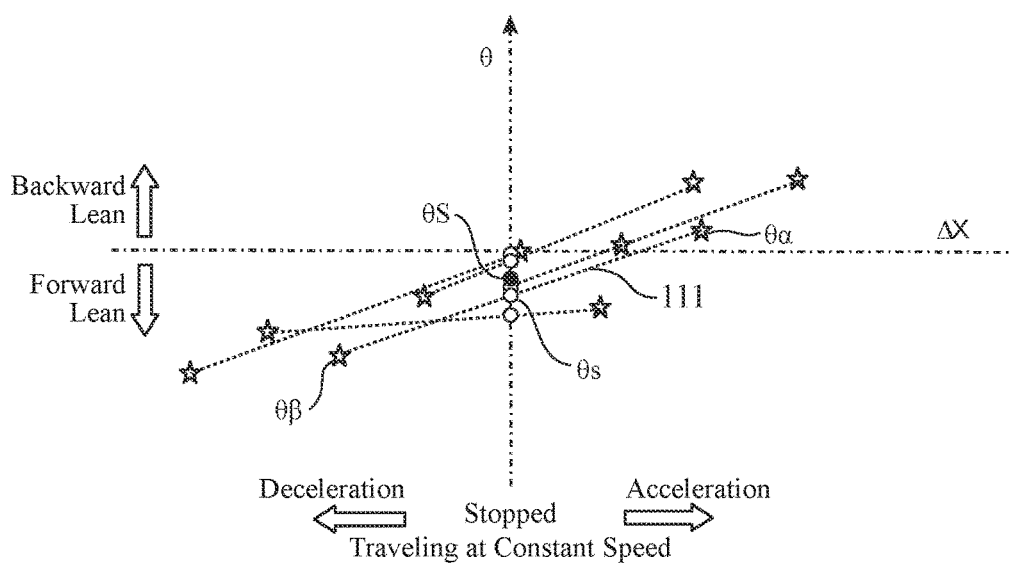
FIG. 6 is a graph for explaining a process of calculating a representative vehicle angle by the optical axis control device for a headlight according to the first embodiment.

Therefore, in the first embodiment, the process of calculating a representative vehicle angle θS such as that shown in FIG. 5 is simplified to a process such as that shown in FIG. 6.

In FIG. 6, as in FIG. 5, vehicle angles θ calculated using differences between acceleration signals in the front-rear direction and up-down direction at two time points which are measured by the acceleration sensor 2 are plotted as stars in the coordinate system in which the horizontal axis is the differential acceleration ΔX in the front-rear direction and the vertical axis is the vehicle angle θ. It is assumed that the vehicle angles θ are calculated at different timings, respectively. The CPU 16 draws a straight line 111 passing through two stars indicating a first vehicle angle θ and a second vehicle angle θ and obtains, as a third vehicle angle θs, the vehicle angle at which the differential acceleration ΔX in the front-rear direction is zero on the straight line 111. In FIG. 6, the third vehicle angle θs is indicated by an open circle. The third vehicle angle θs corresponds to a vehicle angle in a state in which the vehicle 7 is stopped or a state in which the vehicle 7 is traveling at a constant speed. Finally, the CPU 16 obtains, based on a distribution state of a plurality of third vehicle angles θs obtained from a plurality of straight lines 111, a representative vehicle angle θS which is the representative value of the third vehicle angles θs. In FIG. 6, the representative vehicle angle θS is indicated by a closed circle.

More specifically, the CPU 16 calculates a differential acceleration ΔX by equation (1), using acceleration signals Xkm and Xkn in the front-rear direction which are measured at two time points, a km point and a kn point. In addition, the CPU 16 calculates a differential acceleration ΔZ by equation (2), using acceleration signals Zkm and Zkn in the up-down direction which are measured at the same two time points, the km point and the kn point. Subsequently, the CPU 16 calculates a vehicle angle θ from a ratio of the differential acceleration ΔZ to the differential acceleration ΔX by equation (3).

This vehicle angle θ is called a first vehicle angle θα, and the differential acceleration ΔX in the front-rear direction which is used to calculate the first vehicle angle θα is called a first differential acceleration ΔXα. The CPU 16 stores the first vehicle angle θα and the first differential acceleration ΔXα in the storage unit 17 as one set of data.

Subsequently, the CPU 16 calculates a vehicle angle θ by equations (1) to (3), using acceleration signals Xkm, Xkn, Zkm, and Zkn which are measured at two time points different to the above-mentioned two time points.

This vehicle angle θ is called a second vehicle angle θβ, and the differential acceleration ΔX in the front-rear direction which is used to calculate the second vehicle angle θβ is called a second differential acceleration ΔXβ. The CPU 16 stores the second vehicle angle θβ and the second differential acceleration ΔXβ in the storage unit 17 as one set of data.

Subsequently, using the first vehicle angle θα, the first differential acceleration ΔXα, the second vehicle angle θβ, and the second differential acceleration ΔXβ which are stored in the storage unit 17, the CPU 16 calculates, by equation (4), a third vehicle angle θs at which the differential acceleration ΔX is zero on a straight line 111 passing through the first vehicle angle θα and the second vehicle angle θβ.

The CPU 16 repeats the above-described process to calculate N third vehicle angles θs (N≥2). Finally, the CPU 16 calculates the average of the N third vehicle angles θs by equation (5) and sets the calculated average as a representative vehicle angle θS. Note that the representative vehicle angle θS may be any value as long as it is the representative value of the N third vehicle angles θs, and thus may be the median, the mode, or the like, other than the above-described average value.

$$\Delta X = Xkn - Xkm \quad (1)$$

$$\Delta Z = Zkn - Zkm \quad (2)$$

$$\theta = \tan^{-1}(\Delta Z/\Delta X) \quad (3)$$

$$\theta s = (\theta\alpha \cdot \Delta X\beta - \theta\beta \cdot \Delta X\alpha)/(\Delta X\beta - \Delta X\alpha) \quad (4)$$

$$\theta S = (\theta s1 + \theta s2 + \theta s3 + \ldots + \theta sN)/N \quad (5)$$

Note that, as described above, since the vehicle angle θ is calculated using differential accelerations ΔX and ΔZ which are the amounts of change in acceleration, there is no influence of an offset present in outputs from the acceleration sensor 2 and thus there is no problem even if the offset changes over time.

The CPU 16 may be configured to calculate a third vehicle angle θs every time a first vehicle angle θα and a second vehicle angle θβ are calculated, or may be configured to store a plurality of sets of a calculated vehicle angle θ and a differential acceleration ΔX in the storage unit 17 and calculate a third vehicle angle θs by using at least one set of a vehicle angle θ and a differential acceleration ΔX from among the plurality of sets of a vehicle angle θ and a differential acceleration ΔX stored in the storage unit 17.

Now, exemplary configurations A and B will be described in which the CPU 16 uses the vehicle angles θ and differential accelerations ΔX stored in the storage unit 17 when calculating a third vehicle angle θs.

<Exemplary Configuration A>

When the CPU 16 newly calculates a first vehicle angle θα, the CPU 16 selects one set from among a plurality of sets stored in the storage unit 17, and calculates a third vehicle angle θs using the vehicle angle θ and the differential acceleration ΔX included in the selected set, as a second vehicle angle θβ and a second differential acceleration ΔXβ.

In addition, upon selecting, by the CPU 16, one set to be used as a second vehicle angle θβ from among a plurality of sets stored in the storage unit 17 when a first vehicle angle θα is newly calculated, it is preferred to select one set of data in which the difference between a first differential acceleration ΔXα and a second differential acceleration ΔXβ is largest. This is because the larger the difference between the first differential acceleration ΔXα and the second differential acceleration ΔXβ is, the greater the improvement in the accuracy of a straight line 111 connecting a first vehicle angle θα to a second vehicle angle θβ becomes, and thus, a representative vehicle angle θS with high accuracy can be obtained.

<Exemplary Configuration B>

The CPU 16 selects two sets from among a plurality of sets stored in the storage unit 17 and calculates a third vehicle angle θs, using the vehicle angle θ and differential acceleration ΔX included in one of the selected sets, as a first vehicle angle θα and a first differential acceleration ΔXα, and using the vehicle angle θ and differential acceleration ΔX included in the other one of the selected sets, as a second vehicle angle θβ and a second differential acceleration ΔXβ.

In addition, upon selecting, by the CPU 16, two sets from among a plurality of sets stored in the storage unit 17, it is preferred to select two sets of data in which the difference between differential accelerations ΔX is largest. This is because the larger the difference between the first differential acceleration ΔXα and the second differential acceleration ΔXβ is, the greater the improvement in the accuracy of a straight line 111 connecting a first vehicle angle θα to a second vehicle angle θβ becomes, and thus, a representative vehicle angle θS with high accuracy can be obtained.

In the following, the exemplary configuration B is described.

Next, the operation of the optical axis control device for a headlight 10 will be described using a flowchart of FIG. 7.

Figure 7:
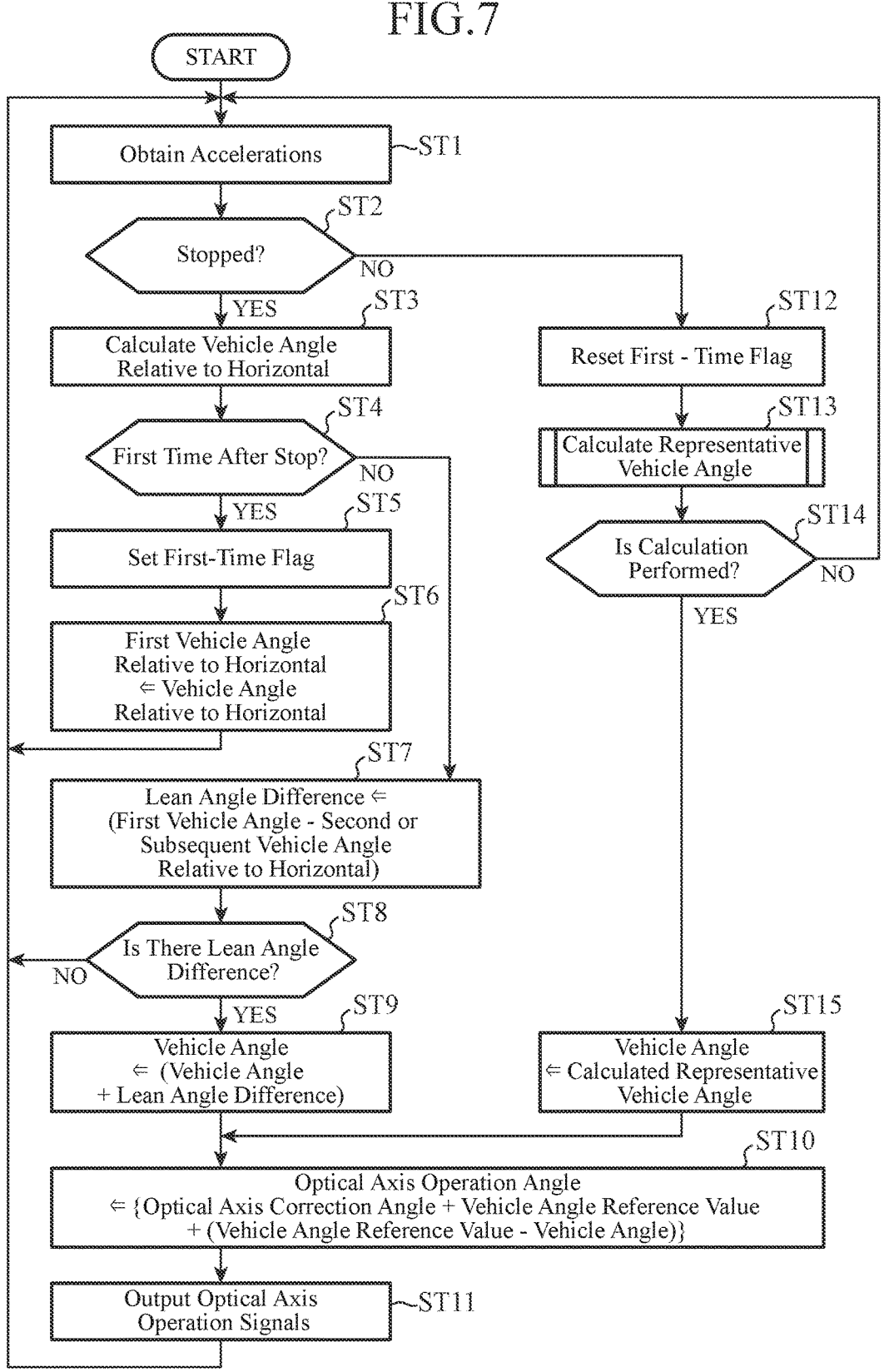
FIG. 7 is a flowchart showing an operation of the optical axis control device for a headlight according to the first embodiment.

When a power is turned on and operation is started, the CPU 16 performs the flowchart of FIG. 7.

The CPU 16 first obtains acceleration signals in the up-down direction and the front-rear direction which are inputted from the acceleration sensor 2 through the acceleration signal input unit 12 (step ST1). The measurement cycle for acceleration signals is, for example, 100 ms.

Subsequently, the CPU 16 determines whether the vehicle 7 is being stopped or traveling, based on a speed signal inputted from the vehicle speed sensor 3 through the speed signal input unit 13 (step ST2). In exemplary operation of FIG. 7, optical axis control for a state in which the vehicle 7 is stopped (steps ST3 to ST9) and optical axis control for a state in which the vehicle 7 is traveling (steps ST12 to ST15) are performed to be switched to each other.

Note that, at step ST2 at which a determination as to whether the vehicle 7 is being stopped or traveling is made, it is desirable that a filter having a delay time of about two seconds, for example, is provided so as to prevent noise included in a speed signal from being erroneously determined as a travel signal or to determine a period from when the vehicle stops to when the vehicle body comes to rest as traveling.

When the vehicle 7 is stopped ("YES" at step ST2), the CPU 16 calculates a lean angle of the vehicle 7 relative to the horizontal direction, using the acceleration signals obtained at step ST1 (step ST3). The lean angle of the vehicle 7 relative to the horizontal direction is called a "vehicle angle relative to horizontal". For a method of calculating a vehicle angle relative to horizontal that uses outputs from an acceleration sensor capable of detecting a gravitational acceleration, any known method may be used, and thus, description thereof is omitted.

In order for the CPU 16 to determine whether the lean of the vehicle 7 is changed due to a passenger getting in or out of the vehicle 7 or loading or unloading of luggage during the stop of the vehicle 7, the CPU 16 has a first-time flag indicating whether a vehicle angle relative to horizontal obtained before the change is stored in the storage unit 17.

When the behavior of the vehicle 7 is changed from traveling to stop, the CPU 16 checks whether the first-time flag is set (step ST4). If the first-time flag is not set ("YES" at step ST4), i.e., immediately after the vehicle 7 is stopped, the CPU 16 sets the first-time flag (step ST5), stores, in the storage unit 17, the vehicle angle relative to horizontal which is calculated at step ST3, as the first vehicle angle relative to horizontal (step ST6), and returns to step ST1.

If the first-time flag is set ("NO" at step ST4), i.e., the second or subsequent time after the vehicle 7 is stopped, the CPU 16 reads the first vehicle angle relative to horizontal from the storage unit 17, and subtracts the vehicle angle relative to horizontal which is calculated at step ST3 from the first vehicle angle relative to horizontal and thereby calculates a lean angle difference (step ST7). If there is a lean angle difference ("YES" at step ST8), it is determined that the lean of the vehicle 7 has been changed due to a passenger getting in or out of the vehicle 7, loading or unloading of luggage, or the like, and accordingly the optical axes have also been changed, and thus, the CPU 16 adds the vehicle angle and the lean angle difference and thereby calculates a vehicle angle after the change (step ST9). If there is no lean angle difference ("NO" at step ST8), then the lean angle of the vehicle 7 has not been changed and accordingly the optical axes have not been changed, and thus, the CPU 16 returns to the process of step ST1.

Step ST10 is a process of obtaining, when the vehicle angle relative to horizontal of the vehicle 7 is changed due to a passenger getting in or out of the vehicle 7, loading or unloading of luggage, or the like, an optical axis operation angle that cancels out the changed angle to bring the optical axes back to their initial positions.

At step ST10, when there is a change between a vehicle angle relative to horizontal obtained immediately after the vehicle 7 is stopped (the first time after the stop) and a vehicle angle relative to horizontal obtained thereafter (the second or subsequent time after the stop), the CPU 16 calculates an optical axis operation angle that cancels out the changed lean angle difference and then brings the optical axes back to their initial positions, and uses the optical axis operation angle for optical axis control. Note that, the vehicle angle relative to horizontal for the first time after the vehicle 7 is stopped is an angle corresponding to a vehicle angle when the vehicle 7 is traveling and there is no passenger getting in or out of the vehicle 7, no loading or unloading of luggage, or the like, and is suitable for a reference for observing a change in lean angle during the stop of the vehicle 7.

In optical axis control performed during the stop of the vehicle 7, for example, with stopping the vehicle 7 on a horizontal road surface in advance, the initial positions of the optical axes are set to be 1% of the angle of depression side. 1% of the angle of depression side is an angle at which the optical axes are lowered by 1 m at a position 100 m ahead. After the setting, the optical axes can be operated in a direction in which the amount of change in vehicle angle is canceled out, so that the optical axes of the headlights 5L and 5R are brought back to their initial positions, in accordance with a difference in vehicle angle that changes due to a passenger getting in or out of the vehicle 7, loading or unloading of luggage, or the like.

As an example, the optical axis operation angle is obtained from an optical axis correction angle stored in the storage unit 17 in advance, a vehicle angle reference value stored in the storage unit 17 in advance, and the vehicle angle calculated at step ST8. By the value (the vehicle angle reference value−the vehicle angle), the amount of change in vehicle angle is canceled out, and by adding the value (the optical axis correction angle+the vehicle angle reference value) to the value (the vehicle angle reference value−the vehicle angle), the optical axes are brought back to their initial positions.

The optical axis correction angle and the vehicle angle reference value will be described later.

The CPU 16 generates optical axis operation signals from the optical axis operation angle obtained at step ST10, and outputs the optical axis operation signals to the optical axis operation devices 6L and 6R through the optical axis operation signal output unit 18 (step ST11). The optical axis operation devices 6L and 6R operate the optical axes of the headlights 5L and 5R, in accordance with the optical axis operation signals sent from the optical axis operation signal output unit 18.

On the other hand, when the behavior of the vehicle 7 is changed from "stop" to "traveling" ("NO" at step ST2), the CPU 16 resets the first-time flag (step ST12). Subsequently, the CPU 16 calculates a representative vehicle angle θS using the acceleration signals obtained at step ST1 (step ST13). If the CPU 16 calculated a representative vehicle angle θS ("YES" at step ST14), the CPU 16 updates the vehicle angle to the value of the representative vehicle angle θS calculated at step ST13 (step ST15). On the other hand, if the CPU 16 has not been able to calculate a representative vehicle angle θS ("NO" at step ST14), the CPU 16 returns to the process of step ST1. Details of steps ST13 and ST14 will be described later.

After step ST15, the CPU 16 calculates an optical axis operation angle at step ST10. At step ST11, the CPU 16 generates optical axis operation signals and outputs the optical axis operation signals to the optical axis operation devices 6L and 6R through the optical axis operation signal output unit 18.

As described above, by calculating a representative vehicle angle θS using accelerations obtained in a state in which the vehicle 7 is traveling, a vehicle angle when the vehicle 7 is stopped or when the vehicle 7 is traveling at a constant speed can be derived without being influenced by the grade of a traveling road and by the lean (pitching) of the vehicle 7 that changes due to the acceleration or deceleration of the vehicle 7.

In addition, since differential accelerations at two time points are used for calculation of a representative vehicle angle θS, there is no influence of an offset present in outputs from the acceleration sensor 2 and thus there is no problem even if the offset changes over time. On the other hand, optical axis control (steps ST3 to ST9) that uses a vehicle angle relative to horizontal in a state in which the vehicle 7 is stopped is performed by a method in which changed angles are accumulated on and on, and thus, cumulative error may be generated. Hence, in optical axis control that uses a vehicle angle relative to horizontal, there is a possibility that the optical axes may be deviated with the passage of time; however, in the first embodiment, by using optical axis control (steps ST12 to ST15) that uses a representative vehicle angle θS in combination, cumulative error can be removed, and as a result, the optical axes of the headlights can be stably maintained at proper angles over a long period of time.

Figure 8A:
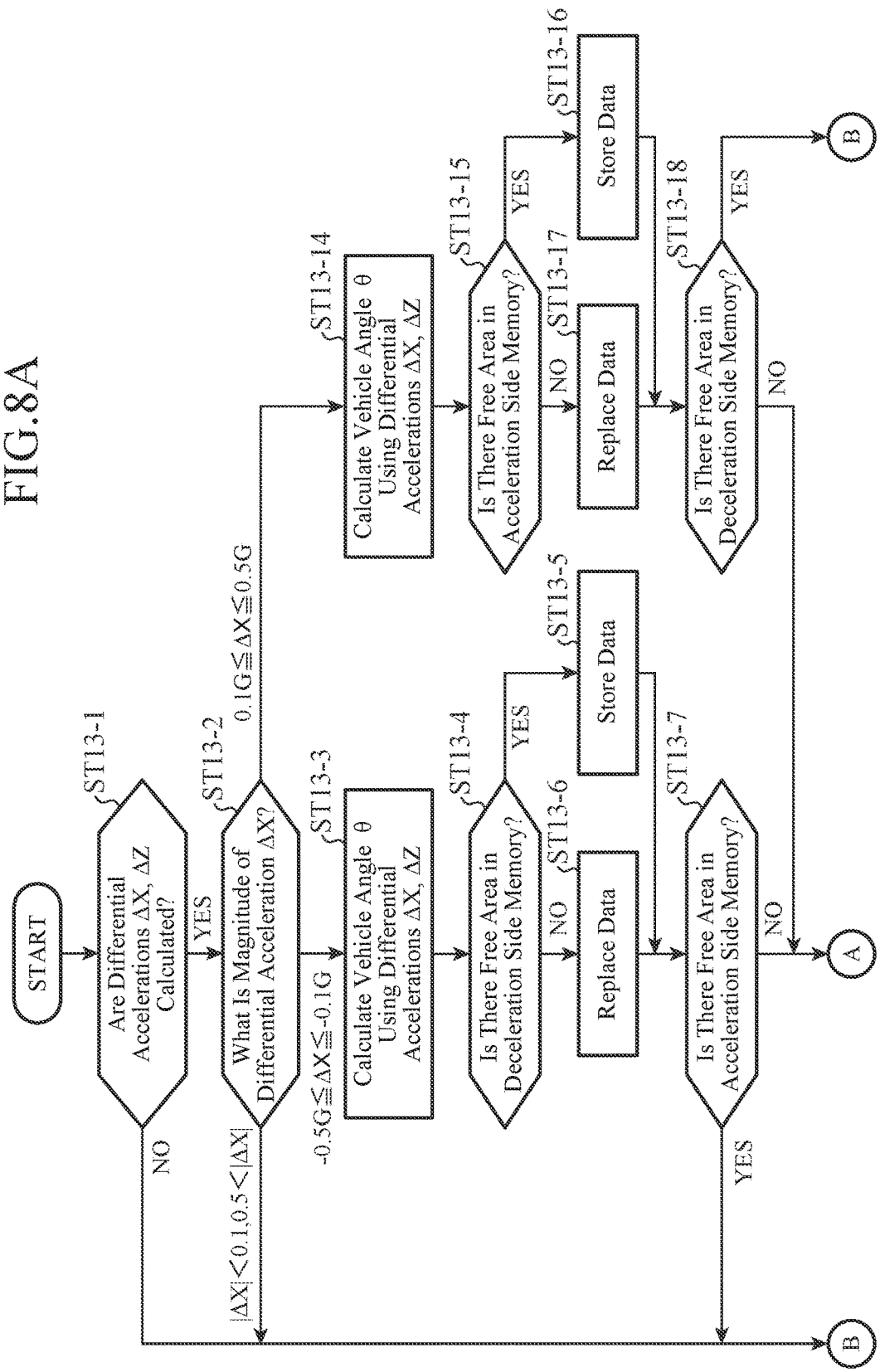
FIG. 8A is a flowchart showing a method of calculating a representative vehicle angle of the optical axis control device for a headlight according to the first embodiment.
Figure 8B:
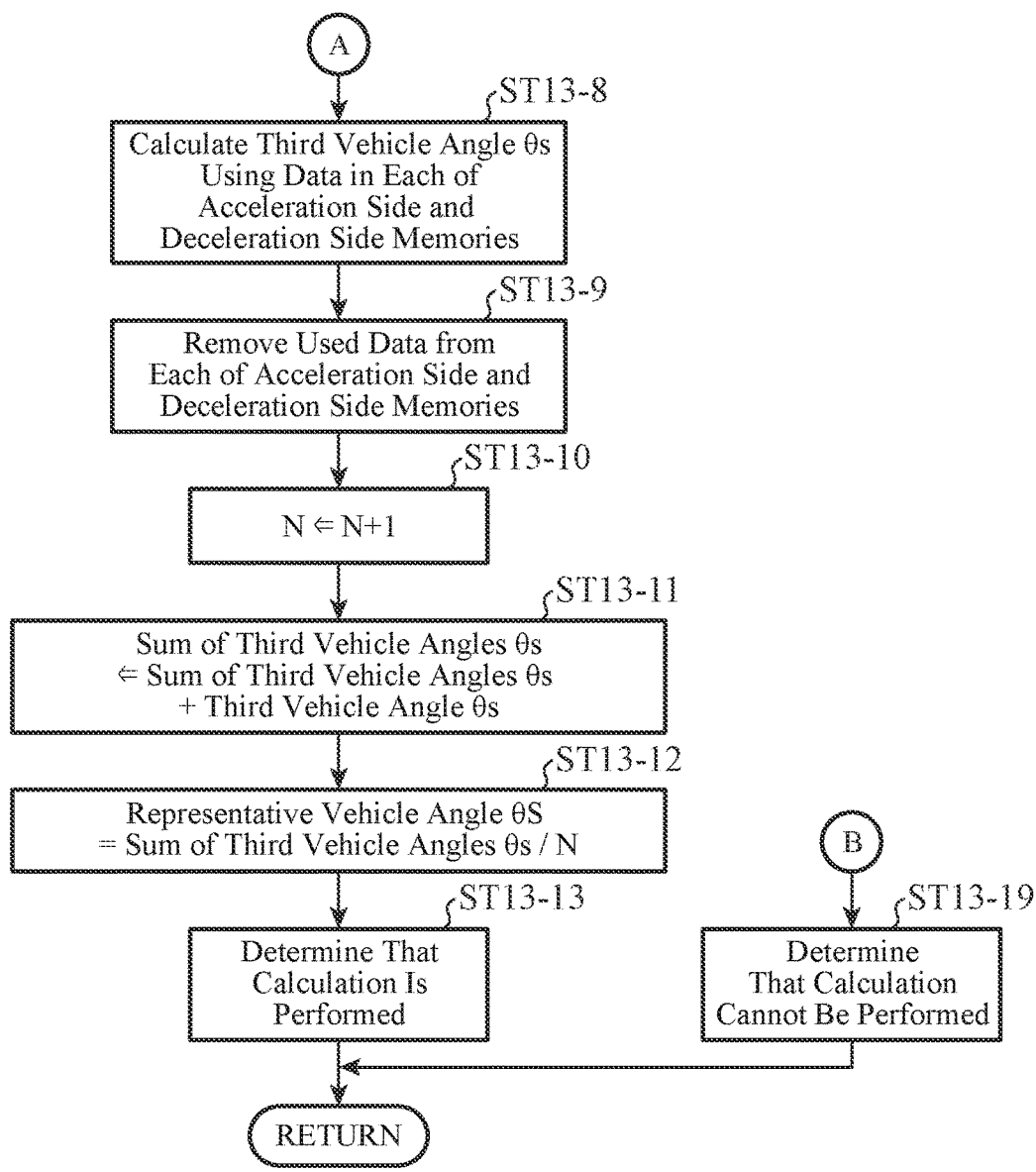
FIG. 8B is a flowchart continued from that shown in FIG. 8A.

Next, the details of the processes at steps ST13 and ST14 shown in FIG. 7 will be described using flowcharts of FIGS. 8A and 8B.

If acceleration signals in the front-rear direction and the up-down direction for two time points which are inputted from the acceleration sensor 2 through the acceleration signal input unit 12 are available, the CPU 16 calculates differential accelerations ΔX and ΔZ, using the acceleration signals in the front-rear direction at the two time points and the acceleration signals in the up-down direction at the two time points ("YES" at step ST13-1). On the other hand, if only acceleration signals for one time point are available, the CPU 16 determines that differential accelerations ΔX and ΔZ cannot be calculated ("NO" at step ST13-1), and as a result, determines that a representative vehicle angle θS cannot be calculated (step ST13-19), and proceeds to the process of step ST14 of FIG. 7. In this case, the CPU 16 determines that the CPU 16 was not able to calculate a representative vehicle angle θS at step ST14 ("NO" at step ST14) and thus returns to the process of step ST1 and obtains acceleration signals for the second time point.

Subsequently, the CPU 16 compares the calculated differential acceleration ΔX in the front-rear direction with a predetermined use range of differential accelerations (step ST13-2). It is assumed that the use range of differential accelerations is stored in the storage unit 17.

Figure 9:
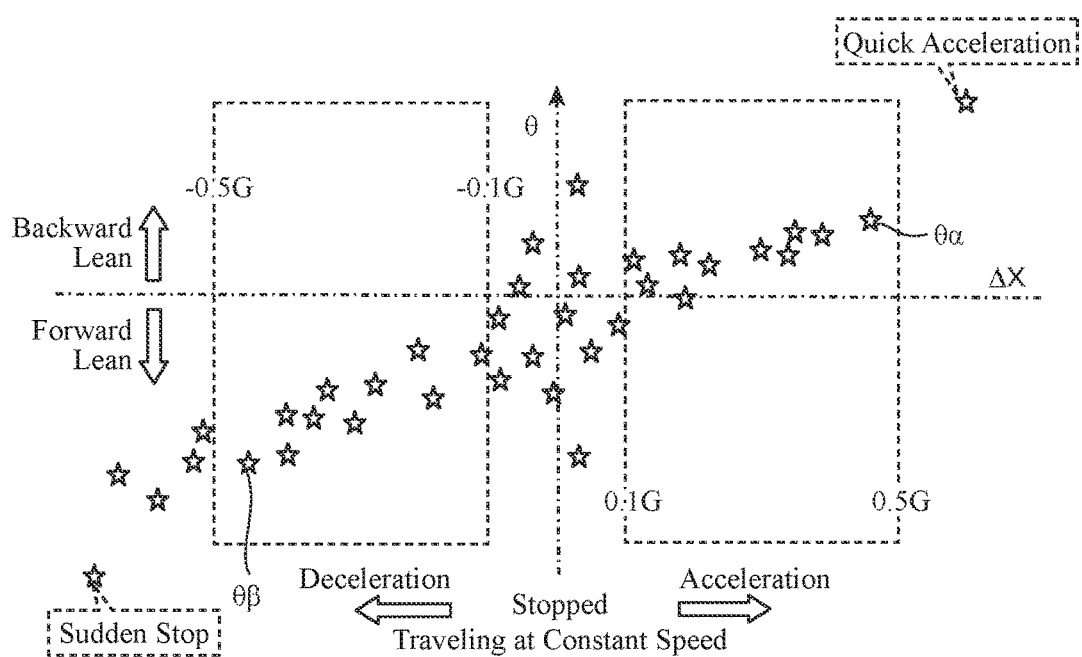
FIG. 9 is a graph showing an example of a use range of differential accelerations in the first embodiment.

Here, FIG. 9 shows an example of the use range of differential accelerations. In FIG. 9, as in FIGS. 5 and 6, vehicle angles θ which are calculated using acceleration signals measured by the acceleration sensor 2 are plotted as stars in the coordinate in which the horizontal axis is the differential acceleration ΔX in the front-rear direction and the vertical axis is the vehicle angle θ. In the drawing, the use range of the differential accelerations ΔX is set to be the range of −0.5 G to −0.1 G and the range of 0.1 G to 0.5 G.

When a large acceleration is measured due to quick acceleration, sudden stop, or the like, of the vehicle 7, the vehicle 7 may also exhibit abnormal behavior. Hence, to exclude acceleration signals obtained upon quick acceleration, sudden stop, or the like, the use range of the differential accelerations ΔX is set to be the range of −0.5 G to 0.5 G. On the other hand, when the acceleration is small, ΔX which is the denominator of the above equation (3) for calculating a vehicle angle θ is small, and accordingly, an abnormal calculation result may be obtained. Hence, the range of −0.1 G to 0.1 G in which an abnormal result of calculation of a vehicle angle θ may be obtained is excluded from the above-described use range. As a result, the use range of the differential accelerations ΔX when the vehicle 7 is decelerating is from −0.5 G to −0.1 G, inclusive, and the use range of the differential accelerations ΔX when the vehicle 7 is accelerating is from 0.1 G to 0.5 G, inclusive.

Note that although in this example the use range is set for the differential acceleration ΔX in the front-rear direction, the use range may be set for acceleration signals in the front-rear direction.

If, at step ST13-2, the differential acceleration ΔX in the front-rear direction is in the deceleration side use range of −0.5 G to −0.1 G inclusive, the CPU 16 proceeds to step ST13-3 and calculates a deceleration vehicle angle θ using the differential accelerations ΔX and ΔZ calculated at step ST13-1.

Subsequently, the CPU 16 checks whether a deceleration side memory in the storage unit 17 has free area (step ST13-4). Here, it is assumed that the storage unit 17 includes two memories, the deceleration side memory and an acceleration side memory. When one set of data includes a vehicle angle θ and a differential acceleration ΔX in the front-rear direction which is used to calculate the vehicle angle θ, the deceleration side memory has capacity capable of storing ten sets of data. The acceleration side memory similarly has capacity capable of storing ten sets of data. Note that the storage area of a single memory may be allocated for a deceleration side memory and an acceleration side memory.

If the deceleration side memory has free are, i.e., the stored data includes nine sets or less ("YES" at step ST13-4), the CPU 16 stores, as one set of data, the deceleration vehicle angle θ calculated at step ST13-3 and the differential acceleration ΔX in the deceleration side memory in the storage unit 17 (step ST13-5).

On the other hand, if the deceleration side memory has no free area, i.e., the stored data includes ten sets ("NO" at step ST13-4), at step ST13-6 the CPU 16 performs data replacement. If the absolute values of all differential accelerations ΔX stored in the deceleration side memory s are greater than the absolute value of the differential acceleration ΔX which is used to calculate the vehicle angle θ at step ST13-3, then the CPU 16 discards the deceleration vehicle angle θ calculated at step ST13-3 and the differential acceleration ΔX. On the other hand, if the absolute values of the differential accelerations ΔX stored in the deceleration side memory include one that is smaller than the absolute value of the differential acceleration ΔX which is used to calculate the vehicle angle θ at step ST13-3, then one set of data including the smaller differential acceleration ΔX is replaced by one set of data calculated at step ST13-3.

Subsequently, the CPU 16 checks whether the acceleration side memory in the storage unit 17 has free area (step ST13-7). If the acceleration side memory has free area, i.e., the stored data includes nine sets or less ("YES" at step ST13-7), the CPU 16 determines that the CPU 16 cannot calculate a representative vehicle angle θS (step ST13-19), and proceeds to step ST14 of FIG. 7. In this case, the CPU 16 determines at step ST14 that the CPU 16 has not been able to calculate a representative vehicle angle θS ("NO" at step ST14), and thus returns to step ST1.

On the other hand, if the acceleration side memory has no free area, i.e., the stored data includes ten sets ("NO" at step ST13-7), the CPU 16 calculates a third vehicle angle θs using one set of data in the acceleration side memory and one set of data in the deceleration side memory (step ST13-8). The CPU 16 may select two sets of data that are used to calculate a third vehicle angle θs in any manner, but it is preferred to select, for example, one set of data with the largest absolute value of the differential acceleration ΔX (indicated as θα in FIG. 9) from among ten sets of data stored in the acceleration side memory and one set of data with the largest absolute value of the differential acceleration ΔX (indicated as θβ in FIG. 9) from among ten sets of data stored in the deceleration side memory. The larger the difference between differential accelerations ΔX in two sets of data which are used to calculate a third vehicle angle θs is, the more the accuracy of a straight line 111 connecting vehicle angles θ in the two sets of data is improved, and thus, a representative vehicle angle θS with high accuracy can be obtained.

Subsequently, the CPU 16 removes the two sets of data used to calculate the third vehicle angle θs at step ST13-8 from the acceleration side memory and the deceleration side memory (step ST13-9). In addition, the CPU 16 increments a count value N for counting the number of third vehicle angles θs used to calculate a representative vehicle angle θS (step ST13-10).

Subsequently, the CPU 16 reads a sum of third vehicle angles θs calculated last time from the storage unit 17, and adds the third vehicle angle θs calculated at step ST13-8 this time to the read sum and thereby calculates a sum of third vehicle angles θs for this time (step ST13-11). The CPU 16 stores the sum of third vehicle angles θs calculated this time in the storage unit 17. Then, the CPU 16 divides the sum of third vehicle angles θs for this time which is calculated at step ST13-11 by the count value N to obtain the average of the third vehicle angles θs, and sets the average as a representative vehicle angle θS (step ST13-12). Note that upon the first calculation of a third vehicle angle θs, a sum of third vehicle angles θs is not yet stored in the storage unit 17, and thus, the third vehicle angle θs calculated this time serves as a representative vehicle angle θS as it is.

Finally, the CPU 16 determines that the representative vehicle angle θS was calculated (step ST13-13), and proceeds to step ST14 of FIG. 7. In this case, the CPU 16 determines at step ST14 that a representative vehicle angle θS was calculated ("YES" at step ST14) and thus proceeds to step ST15.

On the other hand, if, at step ST13-2, the differential acceleration ΔX in the front-rear direction is in the acceleration side use range of 0.1 G to 0.5 G inclusive, the CPU 16 subsequently proceeds to step ST13-14 and calculates an acceleration vehicle angle θ using the differential accelerations ΔX and ΔZ calculated at step ST13-1.

Subsequently, the CPU 16 checks whether the acceleration side memory in the storage unit 17 has free area (step ST13-15), and performs storing of data (step ST13-16) or data replacement (step ST13-17). The processes at steps ST13-15, ST13-16, and ST13-17 are the same as those at steps ST13-4, ST13-5, and ST13-6 and thus description thereof is omitted.

Subsequently, the CPU 16 checks whether the deceleration side memory in the storage unit 17 has free area (step ST17-18). If the deceleration side memory has free area, i.e., the stored data includes nine sets or less ("YES" at step ST13-18), the CPU 16 determines that the CPU 16 cannot calculate a representative vehicle angle θS (step ST13-19), and proceeds to step ST14 of FIG. 7. In this case, the CPU 16 determines that the CPU 16 was not able to calculate a representative vehicle angle θS at step ST14 ("NO" at step ST14), and thus returns to the process of step ST1.

On the other hand, if the deceleration side memory has no free area, i.e., the stored data includes ten sets ("NO" at step ST13-18), the CPU 16 performs the processes at steps ST13-8 to ST13-13 to calculate a representative vehicle angle θS.

Note that when at step ST13-2 the differential acceleration ΔX in the front-rear direction is in neither the deceleration side use range nor the acceleration side use range, the CPU 16 proceeds to step ST13-19 and determines that the CPU 16 cannot calculate a representative vehicle angle θS, and proceeds to step ST14 of FIG. 7.

In the first embodiment, a representative vehicle angle θS is calculated in the above-described manner, and thus, there is no need to store a large number of accelerations in the front-rear direction and vehicle angles to obtain a representative vehicle angle by complex computation as in the process shown in FIG. 5. Accordingly, the number of accelerations in the front-rear direction and vehicle angles to be stored are reduced, and a representative vehicle angle can be derived with high accuracy by simple computation. Thus, comparing with the memory capacity and computation load required to calculate a representative vehicle angle which is shown in FIG. 5, the memory capacity and computation load required to calculate a representative vehicle angle in the first embodiment can be reduced, and as a result, the configuration of the optical axis control device for a headlight 10 is simplified, and the cost can be reduced.

Meanwhile, passenger's getting in and out of the vehicle 7 or loading and unloading of luggage is performed when the vehicle 7 is stopped, and thus, when the vehicle 7 starts traveling, the vehicle angle θ may have been changed. Hence, for removing the influence of a vehicle angle θ obtained before stopping, the representative vehicle angle θS is reset when the vehicle 7 stops, so that a quick-response representative vehicle angle θS with high accuracy can be obtained after starting traveling.

Specifically, when the vehicle 7 stops, the CPU 16 resets data such as a representative vehicle angle θS, and vehicle angles θ, differential accelerations ΔX, and a sum of third vehicle angles θs which are used to calculate the representative vehicle angle θS, and when the vehicle 7 starts traveling, the CPU 16 collects those pieces of data again to calculate a representative vehicle angle θS. The CPU 16 can determine the stop of the vehicle 7 based on, for example, speed information inputted from the speed signal input unit 13. Alternatively, the CPU 16 may determine that the vehicle 7 stops, for example, when the CPU 16 detects a state corresponding to the stop of an engine, based on ignition switch information inputted from the vehicle information input unit 14. In the case of this configuration, a volatile memory or a nonvolatile memory can be used as the storage unit 17.

Figure 10:
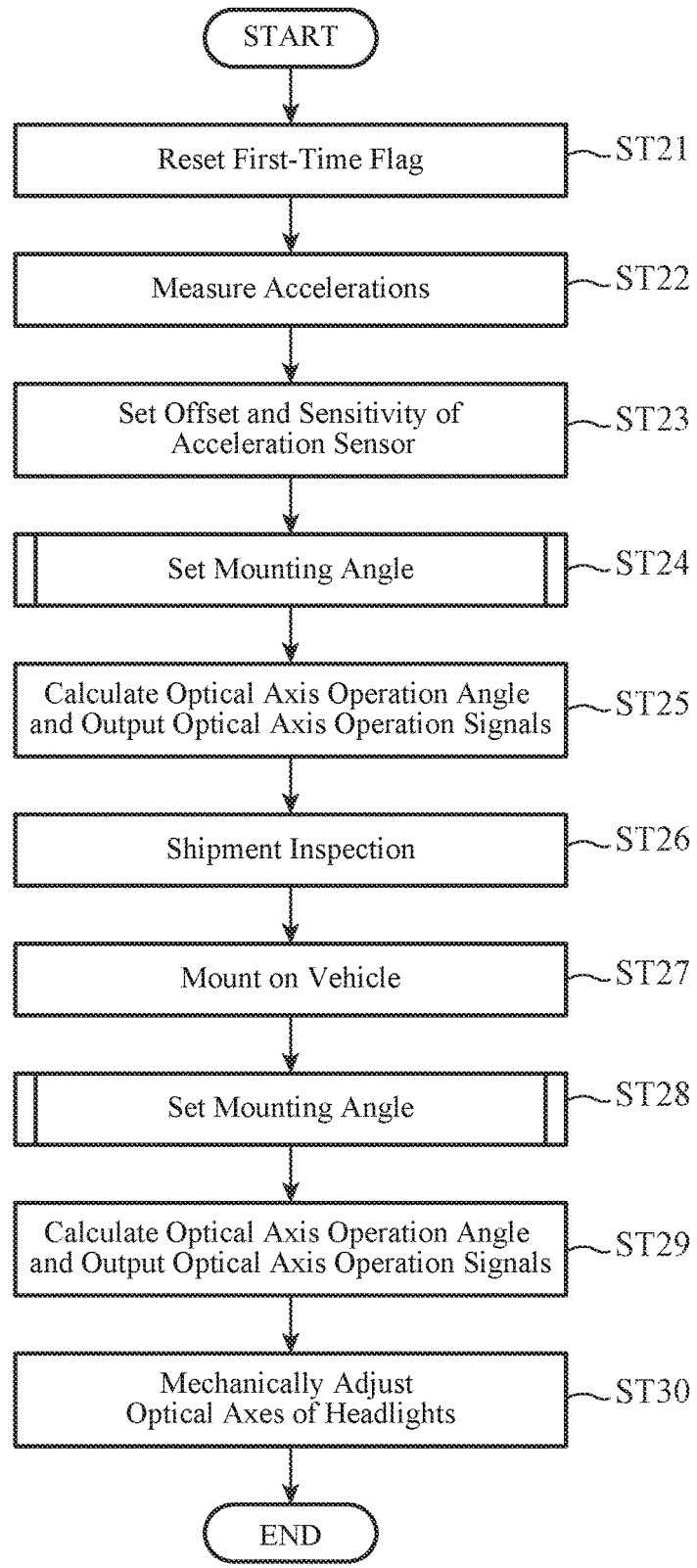
FIG. 10 is a flowchart showing an initial setting method for the optical axis control device for a headlight according to the first embodiment.

Next, an initial setting method for the optical axis control device for a headlight 10 will be described using a flowchart of FIG. 10. Here, a configuration in which, as shown in FIG. 2B or 2C, the acceleration sensor 2 is installed in the optical axis control device for a headlight 10 is used as an example.

At a manufacturing plant, after completion of the optical axis control device for a headlight 10, the first-time flag of the CPU 16 is reset (step ST21). An operator tilts the optical axis control device for a headlight 10 on which the acceleration sensor 2 is mounted in three or more directions, by which the acceleration sensor 2 measures accelerations in the up-down direction and front-rear direction for every tilt and outputs acceleration signals (step ST22). The CPU 16 estimates the offset and sensitivity of the acceleration sensor 2 based on the inputted acceleration signals (step ST23).

FIG. 11A is a diagram describing an acceleration measuring coordinate system and a weight in initial setting which are viewed in a vertical direction and a horizontal direction. The point of intersection of the X-axis and the Z-axis is the origin of the acceleration sensor 2, and the point of intersection of an axis in the vertical direction and an axis in the horizontal direction is the origin O for measurement viewed from the vehicle 7. When at step ST22 the optical axis control device for a headlight 10 on which the acceleration sensor 2 is mounted is rotated as shown in FIG. 11B, the origin O serving as the center of accelerations measured by the acceleration sensor 2 as shown in FIG. 11A, i.e., the center of the circle drawn by the weight hanging from a spring, shows an offset with respect to the acceleration measuring coordinate system, and the magnitude of the circle shows the sensitivity of the acceleration measuring coordinate system. In the drawings, the offset in the X-axis direction is shown as Xoff and the offset in the Z-axis direction is shown as Zoff. θoff indicates a deviation in the mounting angle of the acceleration sensor 2.

Subsequently, the operator fixes the optical axis control device for a headlight 10 on a horizontal surface, and sets the mounting angle of the acceleration sensor 2 with respect to the optical axis control device for a headlight 10 (step ST24). When a setting signal is inputted to the optical axis control device for a headlight 10 from an external source, the optical axis control device for a headlight 10 stores, in the storage unit 17, the set values of the offset and sensitivity of the acceleration sensor 2 at step ST23 and the mounting angle at step ST24.

Note that for the above-described setting signal for storing various types of set values, in place of a set signal inputted via communication with an external device, for example, a specific input pattern may be inputted to the vehicle information input unit 14. For example, such a specific input pattern is, for example, a combination like a cipher such as: setting of a selector lever of a transmission to "R"; setting of a lighting switch to "turning on"; and repeating of setting of a passing switch to "turning on" three-times, etc. Of course, a signal combination for an input pattern may be other than that described above.

Figure 12:
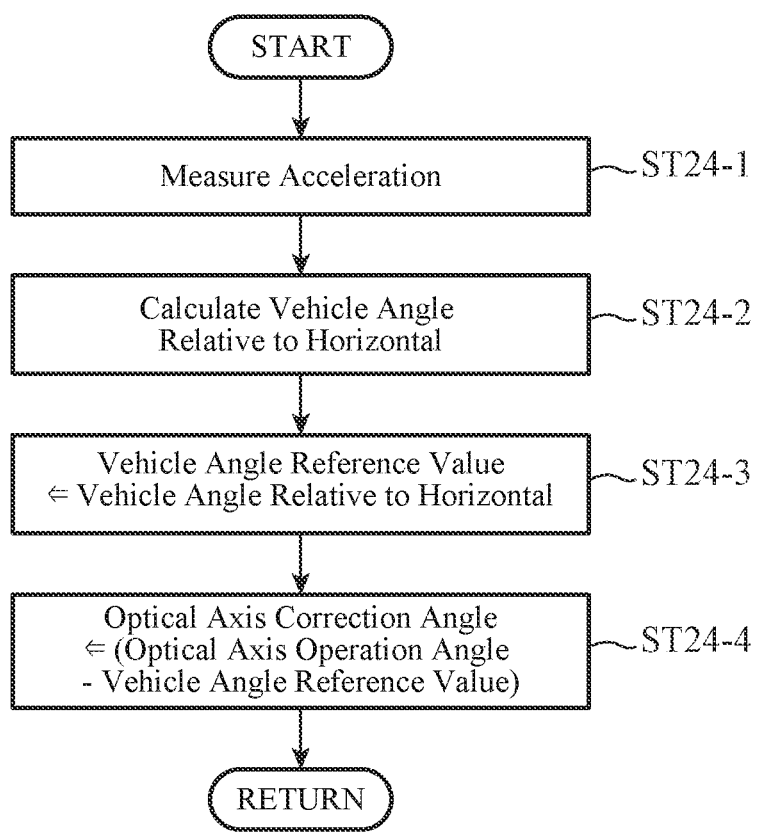
FIG. 12 is a flowchart showing a method of setting a mounting angle of the optical axis control device for a headlight according to the first embodiment.

FIG. 12 shows a method of setting the mounting angle. With the optical axis control device for a headlight 10 being fixed on a horizontal surface, the acceleration sensor 2 measures an acceleration (step ST24-1), and the CPU 16 calculates a vehicle angle relative to horizontal (step ST24-2) and stores, in the storage unit 17, the calculated vehicle angle relative to horizontal as a vehicle angle reference value (step ST24-3). Finally, the CPU 16 subtracts the vehicle angle reference value from an optical axis operation angle (e.g., 0 degree) and thereby calculates an optical axis correction angle and stores the optical axis correction angle in the storage unit 17 (step ST24-4). Note that, upon setting the mounting angle, since the acceleration sensor 2 is fixed on a horizontal surface, the median(=0 degrees) is used as the optical axis operation angle.

The optical axis correction angle=(the optical axis operation angle obtained upon setting the mounting angle−the vehicle angle reference value) at step ST24-4 can be transformed into: the optical axis operation angle obtained upon setting the mounting angle=(the optical axis correction angle+the vehicle angle reference value). The optical axis correction angle and the vehicle angle reference value are stored in the storage unit 17 and used upon execution of the flowchart of FIG. 7.

Subsequently, the CPU 16 generates an optical axis operation signal from the optical axis operation angle obtained upon setting the mounting angle, and outputs the optical axis operation signal (step ST25). The operator checks whether the optical axis operation signal has a correct value (step ST26).

The processes at steps ST27 to ST30 are performed at a vehicle manufacturing plant or repair garage. An operator mounts the optical axis control device for a headlight 10 on a vehicle 7 (step ST27), and sets the mounting angle of the acceleration sensor 2 with respect to the vehicle 7, with the vehicle 7 stopped on a horizontal road surface (step ST28). The processes at steps ST28 and ST29 are the same as those at steps ST24 and ST25.

At step ST28, the setting of the mounting angle is performed by the same procedure as at steps ST24-1 to ST24-4 of FIG. 12. With the vehicle 7 stopped on the horizontal road surface, the operator allows the optical axis control device for a headlight 10 to recognize a vehicle angle relative to horizontal, i.e., a deviation θoff in the mounting angle of the acceleration sensor 2 shown in FIG. 11A, to correct the deviation in the mounting angle of the acceleration sensor 2 with respect to the vehicle 7.

After the above-described electrical setting of the optical axis control device for a headlight 10 is done, the operator mechanically adjusts the optical axes of the headlights 5L and 5R, using a wrench or a screwdriver, and thereby sets the optical axes of the headlights at their initial positions (step ST30). By this, when the optical axis operation angle(=the optical axis correction angle+the vehicle angle reference value) is 0 degrees, the optical axes of the headlights 5L and 5R are at their initial positions.

Note that a nonvolatile memory is used as the storage unit 17 that stores the set values of the offset, sensitivity, and the mounting angle of the acceleration sensor 2, the vehicle angle reference value, and the optical axis correction angle.

As described above, according to the first embodiment, the control unit 15 is configured such that in a state in which the vehicle 7 is traveling, a first vehicle angle θ is calculated from a ratio of a differential acceleration ΔZ in the up-down direction at two first time points to a differential acceleration ΔX in the front-rear direction at the two first time points, a second vehicle angle θ is calculated from a ratio of a differential acceleration ΔZ in the up-down direction at two second time points to a differential acceleration ΔX in the front-rear direction at the two second time points, the two second time points differing from the two first time points, a third vehicle angle θs when the differential acceleration ΔX in the front-rear direction is zero is calculated using the first vehicle angle θ and its corresponding differential acceleration ΔX and the second vehicle angle θ and its corresponding differential acceleration ΔX, a plurality of third vehicle angles θs are calculated to calculate a representative vehicle angle θS based on a distribution of the third vehicle angles θs, and signals for operating the optical axes of the headlights 5L and 5R are generated based on the representative vehicle angle θS. Thus, the memory capacity and computation load required to calculate the representative vehicle angle θS can be reduced. In addition, a representative vehicle angle θS corresponding to a vehicle angle when the vehicle 7 is stopped or traveling at a constant speed can be obtained, and thus, the optical axes of the headlights can be operated using a vehicle angle with high accuracy that does not include a lean angle error occurring due to the acceleration or deceleration of the vehicle 7. Furthermore, since a difference between acceleration signals is used, the influence of a potential offset in outputs from the acceleration sensor 2 and of a change in the offset over time can be reduced, and as a result, it is possible to obtain a stable vehicle angle over a long period of time. By this, the optical axis control device for a headlight 10 capable of controlling the optical axes of the headlights in high accuracy can be implemented.

In addition, according to the first embodiment, since the control unit 15 is configured to calculate, as the representative vehicle angle θS, the average, the median, or the mode of the plurality of third vehicle angles θs, the representative vehicle angle θS can be obtained without performing complex computation.

In addition, according to the first embodiment, since the control unit 15 is configured to use acceleration signals in a predetermined use range or differential accelerations ΔX in a predetermined use range, to calculate the first vehicle angle θ and the second vehicle angle θ, acceleration signals or differential accelerations obtained upon quick acceleration, sudden stop, or traveling at very low speed can be prevented from being used for calculation of a vehicle angle θ, and accordingly, a representative vehicle angle θS with high accuracy can be obtained.

In addition, according to the first embodiment, since the control unit 15 is configured to include the storage unit 17 that stores a plurality of sets of data in which each set of data includes a vehicle angle θ and a differential acceleration ΔX, and to select and use at least one set of data from among the plurality of sets of data stored in the storage unit 17, to calculate the third vehicle angle θs. As a result, data that allows to accurately draw a straight line 111 can be selected from among the plurality of sets of data, and thus, a representative vehicle angle θS can be obtained with high accuracy.

In addition, according to the first embodiment, since the control unit 15 is configured to reset the representative vehicle angle θS when the vehicle 7 stops, and calculate the representative vehicle angle θS again when the vehicle 7 starts traveling, the influence of a vehicle angle θ before stopping does not remain in a representative vehicle angle θS after starting traveling. Therefore, a quick-response representative vehicle angle θS with high accuracy can be obtained.

In addition, according to the first embodiment, by integrally forming the acceleration sensor 2 with the optical axis control device for a headlight 10 as shown in FIG. 2B, wiring lines can be omitted, and as a result, an optical axis control device for a headlight 10 with a simple configuration can be implemented.

In addition, according to the first embodiment, by integrally forming the optical axis control device for a headlight 10 with an in-vehicle electrical component 8 having a different function than optical axis control as shown in FIG. 2C, the optical axis control device for a headlight 10 is not present as an independent component, and thus, a system configuration to be mounted on the vehicle 7 becomes simple.

Second Embodiment

A configuration of an optical axis control device for a headlight according to a second embodiment is the same in the drawing as that of the optical axis control device for a headlight 10 shown in FIG. 1 in the above-described first embodiment, and thus, FIG. 1 is used for the following explanation.

In the optical axis control device for a headlight 10 according to the second embodiment, the CPU 16 uses an acceleration serving as a reference, for either one of an acceleration signal at the km point and an acceleration signal at the kn point which are used to calculate a vehicle angle θ. In the following, the acceleration serving as a reference is called a "reference acceleration".

The CPU 16 in the second embodiment uses, as the reference acceleration, for example, an acceleration signal measured by the acceleration sensor 2 in a state in which the vehicle 7 is stopped.

When, in the flowchart shown in FIG. 7 in the above-described first embodiment, optical axis control (steps ST3 to ST9) is performed in a state in which the vehicle 7 is stopped, the CPU 16 of the second embodiment stores, in the storage unit 17, an acceleration signal when the vehicle is stopped which is obtained at step ST1, as reference acceleration. Thereafter, when optical axis control (steps ST12 to ST15) is performed in a state in which the vehicle 7 is traveling, the CPU 16 of the second embodiment obtains the reference acceleration stored in the storage unit 17 and calculates a vehicle angle θ by the above equations (1) to (3), using the reference acceleration as an acceleration signal at the km point and using an acceleration signal for traveling which is obtained at step ST1 this time as an acceleration signal at the kn point.

By using an acceleration signal measured in a stop state as the reference acceleration, a changing acceleration, i.e., a differential acceleration, can be easily detected and thus a vehicle angle θ with high accuracy can be obtained. By this, the optical axis control device for a headlight 10 capable of accurately controlling the optical axes of the headlights can be implemented.

However, if only an acceleration signal measured in a state in which the vehicle 7 is stopped on a horizontal road surface is used as the reference acceleration, then the vehicle angle θ may be deviated on upward slope or downward slope. Hence, as the reference acceleration, an acceleration signal measured in a state in which the vehicle 7 is traveling at a constant speed or an average of acceleration signals measured over a long period of time may be used.

Even when the vehicle 7 is traveling on a road including an upward or downward slope, since the vehicle 7 is traveling by repeating acceleration and deceleration, there is timing at which the vehicle 7 is traveling at a constant speed between the acceleration and deceleration. Thus, by using, as the reference acceleration, an acceleration signal measured in a state in which the vehicle 7 is traveling at a constant speed between acceleration and deceleration, even when the vehicle 7 is traveling on a slope where the time period in which the grade of a road surface is considered to be constant is short, a vehicle angle θ is easily calculated.

At step ST2 of the flowchart shown in FIG. 7 in the above-described first embodiment, the CPU 16 of the second embodiment not only determines whether the vehicle 7 is being stopped or traveling, based on a speed signal inputted from the vehicle speed sensor 3 through the speed signal input unit 13, but also determines whether the vehicle 7 is traveling at a constant speed. When the CPU 16 of the second embodiment determines that the vehicle 7 is traveling at a constant speed, the CPU 16 stores, in the storage unit 17, an acceleration signal during constant-speed traveling which is obtained at step ST1 this time, as the reference acceleration. Thereafter, when optical axis control (steps ST12 to ST15) is performed in a state in which the vehicle 7 is traveling, the CPU 16 of the second embodiment uses the reference acceleration stored in the storage unit 17.

Alternatively, by averaging acceleration signals obtained over a long period of time that include all of a state in which the vehicle 7 is traveling on an upward slope, a state in which the vehicle 7 is traveling on a downward slope, a state in which the vehicle 7 is accelerating, and a state in which the vehicle 7 is decelerating, and using the resulting average as the reference acceleration, a vehicle angle θ equivalent to a vehicle angle obtained in a state in which the vehicle 7 is stopped on a horizontal road surface can be obtained. The CPU 16, for example, collects acceleration signals over a longer period of time than a time interval between two time points of differential accelerations which are used to calculate a vehicle angle θ, calculates an average of the collected acceleration signals, and uses the average as the reference acceleration. By increasing the acceleration signal collecting time, all states including upward slope, downward slope, acceleration, and deceleration can be included, and thus, the accuracy of a vehicle angle θ is improved.

When, at step ST2 of the flowchart shown in FIG. 7 in the above-described first embodiment, the CPU 16 of the second embodiment determines that the vehicle 7 is traveling based on a speed signal inputted from the vehicle speed sensor 3 through the speed signal input unit 13, the CPU 16 stores, in the storage unit 17, an acceleration signal when the vehicle 7 is traveling which is obtained at step ST1 this time. Then, the CPU 16 of the second embodiment averages a plurality of acceleration signals when the vehicle 7 is traveling which are stored in the storage unit 17, and uses the resulting average as the reference acceleration.

As described above, according to the second embodiment, the control unit 15 is configured to use an acceleration signal corresponding to a predetermined reference acceleration, as either one of acceleration signals measured at two time points. Thus, for example, by using an acceleration signal measured in a state in which the vehicle 7 is stopped as the reference acceleration, differential accelerations can be easily detected, and thus, a vehicle angle θ with high accuracy can be obtained. Accordingly, the optical axis control device for a headlight 10 capable of accurately controlling the optical axes of the headlights can be implemented. In addition, by using, as the reference acceleration, an acceleration signal measured in a state in which the vehicle 7 is traveling at a constant speed, or an average of a plurality of acceleration signals measured over a longer period of time than a time interval between two time points for differential accelerations which are used to calculate a vehicle angle θ, too, the optical axis control device for a headlight 10 capable of accurately controlling the optical axes of the headlights can be implemented.

Further, according to the second embodiment, since the control unit 15 is configured to determine a state in which the vehicle 7 is stopped or a state in which the vehicle 7 is traveling at a constant speed, using a speed signal measured by the vehicle speed sensor 3 mounted on the vehicle 7, the control unit 15 can determine the state of the vehicle 7, such as stop, constant-speed traveling, acceleration, and deceleration, using speed information of the vehicle speed sensor 3 without using the acceleration sensor 2 in which noise caused by vibration is likely to be included. Then, since the control unit 15 can accurately extract, based on the result of the above-described determination, an acceleration signal to be used as reference acceleration, it is possible to calculate the vehicle angle θ with high accuracy.

Note that, any combination of the embodiments, modifications or omissions of any component in embodiments which fall within the scope of the present invention may be made to the present invention.

INDUSTRIAL APPLICABILITY

An optical axis control device for a headlight according to the present invention is capable of controlling the optical axis of a headlight with high accuracy even when an acceleration sensor is used, and thus is suitable for use as, for example, an optical axis control device for a headlight that uses a bright light source such as LEDs.

REFERENCE SIGNS LIST

1: In-vehicle battery, 2: Acceleration sensor, 3: Vehicle speed sensor, 4: Switch, 5L: Left-side headlight, 5R: Right-side headlight, 6L and 6R: Optical axis operation device, 7: Vehicle, 8: In-vehicle electrical component, 10: Optical axis control device for a headlight, 11: Power supply unit, 12: Acceleration signal input unit, 13: Speed signal input unit, 14: Vehicle information input unit, 15: Control unit, 16: CPU, 17: Storage unit, and 18: Optical axis operation signal output unit

The invention claimed is:

1. An optical axis control device for a headlight, the optical axis control device comprising:
a controller configured to calculate a vehicle angle using acceleration in an up-down direction and in a front-rear direction, and generate a signal to operate an optical axis of the headlight, the acceleration being measured by an acceleration sensor mounted on a vehicle, and the vehicle angle being a lean angle of the vehicle with respect to a road surface, wherein
in a state in which the vehicle is traveling, the controller:
calculates a first vehicle angle from a ratio of a difference between acceleration in the up-down direction measured at two first time points to a difference between acceleration in the front-rear direction measured at the two first time points;
calculates a second vehicle angle from a ratio of a difference between acceleration in the up-down direction measured at two second time points to a difference between acceleration in the front-rear direction measured at the two second time points, the two second time points differing from the two first time points;
calculates a third vehicle angle, based on a differential acceleration in the front-rear direction being zero, using the first and second vehicle angles and the differences between the acceleration in the front-rear direction used to calculate the first and second vehicle angles; and
calculates a plurality of different third vehicle angles by calculating different first and second vehicle angles, the plurality of different third vehicle angles are used to calculate a single representative value of the third vehicle angles based on a distribution of the plurality of third vehicle angles, and generates a signal to operate the optical axis of the headlight, based on the single representative value.

2. The optical axis control device for the headlight according to claim 1, wherein the controller calculates, as the representative value, an average, a median, or a mode of the plurality of third vehicle angles.

3. The optical axis control device for the headlight according to claim 1, wherein the controller uses an acceleration corresponding to a predetermined reference acceleration as any of: one of the acceleration in the up-down direction measured at the two first time points; one of the acceleration in the front-rear direction measured at the two first time points; one of the acceleration in the up-down direction measured at the two second time points; or, one of the acceleration in the front-rear direction measured at the two second time points.

4. The optical axis control device for the headlight according to claim 3, wherein the reference acceleration is one of an acceleration measured in a state in which the vehicle is stopped, an acceleration measured in a state in which the vehicle is traveling at a constant speed, and an average of a plurality of accelerations measured over a longer period of time than a time interval between the two first time points or between the two second time points.

5. The optical axis control device for the headlight according to claim 4, wherein the controller determines the state in which the vehicle is stopped or the state in which the vehicle is traveling at the constant speed, using a speed signal measured by a vehicle speed sensor mounted on the vehicle.

6. The optical axis control device for the headlight according to claim 1, wherein the controller uses acceleration in a predetermined range as any of: the acceleration in the up-down direction measured at the two first time points; the acceleration in the front-rear direction measured at the two first time points; the acceleration in the up-down direction measured at the two second time points; or the acceleration in the front-rear direction measured at the two second time points, or uses differences between acceleration in a predetermined range as any of: the difference between the acceleration in the up-down direction measured at the two first time points; the difference between the acceleration in the front-rear direction measured at the two first time points; the difference between the acceleration in the up-down direction measured at the two second time points; or the difference between the acceleration in the front-rear direction measured at the two second time points, to calculate the first vehicle angle and the second vehicle angle.

7. The optical axis control device for the headlight according to claim 1, further comprising a storage configured to store a plurality of sets of data, each set of data including a calculated vehicle angle and a difference between acceleration in the front-rear direction used to calculate the calculated vehicle angle, the calculated vehicle angle being calculated from a ratio of a difference between acceleration in the up-down direction measured at two time points to a difference between acceleration in the front-rear direction measured at the two time points, wherein
the controller is configured to select and use at least one set of data from among the plurality of sets of data stored in the storage as at least one of the first or second vehicle angles, to calculate the third vehicle angle.

8. The optical axis control device for the headlight according to claim 7, wherein the controller selects and uses two sets of data from among the plurality of sets of data stored in the storage, to calculate the third vehicle angle.

9. The optical axis control device for the headlight according to claim 8, wherein the controller selects two sets of data such that a difference between the differences between acceleration in the front-rear direction is largest from among the plurality of sets of data stored in the storage, to calculate the third vehicle angle.

10. The optical axis control device for the headlight according to claim 1, wherein the controller resets the representative value when the vehicle stops, and calculates the representative value again when the vehicle starts traveling.

11. The optical axis control device for the headlight according to claim 1, wherein the optical axis control device for the headlight is integrally formed with the acceleration sensor.

12. The optical axis control device for the headlight according to claim 1, wherein the optical axis control device for the headlight is integrally formed with an in-vehicle electrical component mounted on the vehicle.

* * * * *